US011952077B2

United States Patent
Arbesman (10) Patent No.: US 11,952,077 B2
(45) Date of Patent: Apr. 9, 2024

(54) BRAKE PAD ASSEMBLY FOR A BICYCLE AND METHOD FOR ASSEMBLING A BRAKE PAD ASSEMBLY FOR A BICYCLE

(71) Applicant: NUCAP INDUSTRIES INC., Toronto (CA)

(72) Inventor: Roman Arbesman, Toronto (CA)

(73) Assignee: Nucap Industries Inc., Toronto (CA)

( * ) Notice: Subject to any disclaimer, the term of this patent is extended or adjusted under 35 U.S.C. 154(b) by 351 days.

(21) Appl. No.: 17/267,959

(22) PCT Filed: Aug. 9, 2019

(86) PCT No.: PCT/CA2019/051092
§ 371 (c)(1),
(2) Date: Feb. 11, 2021

(87) PCT Pub. No.: WO2020/034026
PCT Pub. Date: Feb. 20, 2020

(65) Prior Publication Data
US 2021/0179228 A1  Jun. 17, 2021

Related U.S. Application Data

(60) Provisional application No. 62/718,222, filed on Aug. 13, 2018.

(51) Int. Cl.
*B62L 1/00* (2006.01)
*F16D 65/097* (2006.01)
(Continued)

(52) U.S. Cl.
CPC .......... *B62L 1/005* (2013.01); *F16D 65/0979* (2013.01); *F16D 69/0408* (2013.01);
(Continued)

(58) Field of Classification Search
CPC .. B62L 1/005; F16D 65/0979; F16D 69/0408; F16D 2127/02; F16D 2250/0061; F16D 2250/0084; F16D 2069/0441
See application file for complete search history.

(56) References Cited

U.S. PATENT DOCUMENTS 3,894,618 A   7/1975  Enright
5,803,207 A   9/1998  Nielsen
(Continued)

FOREIGN PATENT DOCUMENTS

CA   3109417 A1   2/2020
DE   19746572 A1   4/1999
(Continued)

OTHER PUBLICATIONS

British Patent No. GB 2093937 to Toshiharu published on Sep. 8, 1982.*
(Continued)

*Primary Examiner* — Pamela Rodriguez
(74) *Attorney, Agent, or Firm* — Aird & McBurney LP (57) ABSTRACT

A brake pad assembly for a bicycle includes a first brake pad, a second brake pad, and a spreader spring. The first brake pad has a first backing plate with a first rotor facing surface, and a first friction pad secured to the rotor facing surface. The second brake pad has a second backing plate with a second rotor facing surface, and a second friction pad secured to the second rotor facing surface and facing the first friction pad. The spreader spring has a first leaf that is fixed to the first brake pad and a second leaf that is fixed to the second brake pad. At least a portion of the first leaf is positioned between the first rotor facing surface and the first friction pad, and at least a portion of the second leaf is positioned between the second rotor facing surface and the second friction pad.

22 Claims, 4 Drawing Sheets

(51) Int. Cl.
*F16D 69/04* (2006.01)
*F16D 127/02* (2012.01)

(52) U.S. Cl.
CPC .. *F16D 2069/0441* (2013.01); *F16D 2127/02* (2013.01); *F16D 2250/0007* (2013.01); *F16D 2250/0061* (2013.01); *F16D 2250/0069* (2013.01); *F16D 2250/0084* (2013.01)

(56) References Cited

U.S. PATENT DOCUMENTS

| | | |
|---|---|---|
| 6,308,806 B1 | 10/2001 | Nielsen |
| 6,431,331 B1 * | 8/2002 | Arbesman .............. F16D 69/04 |
| | | 188/250 G |
| 6,736,243 B1 | 5/2004 | Fong |
| 8,550,220 B2 | 10/2013 | Iwai et al. |
| 9,309,938 B2 | 4/2016 | Nakakura |
| 10,487,894 B2 * | 11/2019 | Meggiolan .......... F16D 65/0972 |
| 2014/0083805 A1 | 3/2014 | Hirotomi |

FOREIGN PATENT DOCUMENTS

| | | |
|---|---|---|
| EP | 0542134 A1 | 5/1993 |
| EP | 3431804 A1 | 1/2019 |
| KR | 20120097576 A | 9/2012 |

OTHER PUBLICATIONS

Extended European Search Report for European Patent Application No. 19849189.6, dated Mar. 31, 2022.
Written Opinion for International Application No. PCT/CA2019/051092, dated Oct. 4, 2019.
International Search Report for International Application No. PCT/CA2019/051092, dated Oct. 4, 2019.

* cited by examiner

BRAKE PAD ASSEMBLY FOR A BICYCLE AND METHOD FOR ASSEMBLING A BRAKE PAD ASSEMBLY FOR A BICYCLE

CROSS-REFERENCES TO RELATED APPLICATIONS

This application claims the benefit of and/or priority from U.S. Provisional Patent Application No. 62/718,222, filed on Aug. 13, 2018, which is incorporated herein by reference in its entirety.

FIELD

This document relates to disc brakes for bicycles. More specifically, this document relates to brake pad assemblies for bicycle disc brakes, and methods for assembling such brake pad assemblies.

BACKGROUND

U.S. Pat. No. 6,318,514 (Hinkens et al.) discloses a disc brake assembly that includes an improved pad holder for holding a brake pad in the brake assembly. The pad holder takes the form of a simple spring clip, preferably a wire form, that holds the rear surface of the pad tightly against the front surface of the piston or pistons of the associated caliper to prevent brake drag and brake rattle.

U.S. Pat. No. 6,394,236 (Matsuishita) discloses a bicycle cable disc brake that is provided with an adjustable return spring for moving the cable disc brake from a braking position to a release position. The cable disc brake has a cable housing, a pair of friction members, a cable actuated mechanism and a biasing member. The first friction member is movably coupled to the caliper housing between a release position and a braking position. The second caliper is also coupled to the caliper housing and arranged substantially parallel to the first friction member to form a rotor receiving slot therebetween. The cable actuated mechanism is movably coupled to the caliper housing to move the first friction member from the release position towards the second friction member to the braking position. The biasing member has a first end adjustably coupled to the caliper housing and a second end adjustably coupled to the cable actuated mechanism to urge the cable actuated mechanism to the release position.

SUMMARY

The following summary is intended to introduce the reader to various aspects of the detailed description, but not to define or delimit any invention.

According to some aspects a brake pad assembly for a bicycle includes a first brake pad, a second brake pad, and a spreader spring. The first brake pad has a first backing plate with a first rotor facing surface, and a first friction pad secured to the rotor facing surface. The second brake pad has a second backing plate with a second rotor facing surface, and a second friction pad secured to the second rotor facing surface and facing the first friction pad. The spreader spring has a first leaf and a second leaf. At least a portion of the first leaf is fixed between the first rotor facing surface and the first friction pad, and at least a portion of the second leaf is fixed between the second rotor facing surface and the second friction pad. The spreader spring is biased towards a spread position in which the first brake pad and second brake pad are spaced apart from each other, and is moveable to a compressed position in which the first brake pad and the second brake pad are moved towards each other relative to the spread position.

In some examples, the first friction pad has a first plate-facing surface joined to the first rotor facing surface, and the portion of the first leaf is received and fixed in a groove of the first plate-facing surface. The portion of the first leaf can fixed in the groove by friction. The portion of the first leaf can be fixed in the groove by an adhesive.

In some examples, second friction pad has a second plate-facing surface joined to the second rotor facing surface, and the portion of the second leaf is received and fixed in a groove of the second plate-facing surface. The portion of the second leaf can fixed in the groove of the second plate facing surface by friction. The portion of the second leaf can be fixed in the groove of the second plate facing surface by an adhesive.

In some examples, the first leaf is forked and includes a first tine and a second tine, the first friction pad has a first plate-facing surface joined to the first rotor facing surface, and the first plate-facing surface includes a first groove and a second groove. The first tine can be received and fixed in the first groove and the second tine can be received and fixed in the second groove.

In some examples, the second leaf is forked and includes a third tine and a fourth tine, the second friction pad has a second plate-facing surface joined to the second rotor facing surface, and the second plate-facing surface includes a third groove and a fourth groove. The third tine can be received and fixed in the third groove and the fourth tine can be received and fixed in the fourth groove.

In some examples, the first friction pad is adhered to the first rotor facing surface and the second friction pad is adhered to the second rotor facing surface. In some examples, the first friction pad is mechanically secured to the first rotor facing surface and the second friction pad is mechanically secured to the second rotor facing surface. In some examples, the first friction pad is molded onto the first rotor facing surface and the second friction pad is molded onto the second rotor facing surface.

According to some aspects, a brake pad assembly for a bicycle includes a first brake pad, a second brake pad, and a spreader spring. The first brake pad has a first backing plate with a first rotor facing surface, and a first friction pad secured to the rotor facing surface. The second brake pad has a second brake backing plate with a second rotor facing surface, and a second friction pad secured to the second rotor facing surface and facing the first friction pad. The spreader spring has a first leaf fixed to the first brake pad and a second leaf fixed to the second brake pad. The spreader spring is biased towards a spread position in which the first brake pad and second brake pad are spaced apart from each other, and moveable to a compressed position in which the first brake pad and the second brake pad are moved towards each other relative to the spread position.

In some examples, the first leaf is permanently fixed to the first brake pad and the second leaf is permanently fixed to the second brake pad.

In some examples, a portion of the first leaf is positioned between the first rotor facing surface and the first friction pad, and a portion of the second leaf is positioned between the second rotor facing surface and the second friction pad. The first friction pad can have a first plate-facing surface joined to the first rotor facing surface, and the portion of the first leaf can be received and fixed in a groove of the first plate-facing surface. The second friction pad can have a second plate-facing surface joined to the second rotor facing surface, and the portion of the second leaf can be received and fixed in a groove of the second plate-facing surface.

In some examples, the first leaf is forked and includes a first tine and a second tine, the first friction pad has a first plate-facing surface joined to the first rotor facing surface, and the first plate-facing surface includes a first groove and a second groove. The first tine can be received and fixed in the first groove and the second tine can be received and fixed in the second groove.

In some examples, the second leaf is forked and includes a third tine and a fourth tine, the second friction pad has a second plate-facing surface joined to the second rotor facing surface, and the second plate-facing surface includes a third groove and a fourth groove. The third tine can be received and fixed in the third groove and the fourth tine can be received and fixed in the fourth groove.

According to some aspects, a method of assembling a brake pad assembly for a bicycle includes: a) fixing at least a portion of a first leaf of a spreader spring between a rotor facing surface of a first brake backing plate and a first friction pad; and b) fixing at least a portion of a second leaf of the spreader spring between a rotor facing surface of a second brake backing plate and a second friction pad.

In some examples, step a) includes i) positioning the portion of the first leaf between the rotor facing surface of the first brake backing plate and the first friction pad, and ii) securing the first friction pad to the rotor facing surface of the first brake backing plate with the portion of the first leaf positioned between the first friction pad and the rotor facing surface of the first brake backing plate. In some examples, step b) includes iii) positioning the portion of the second leaf between the rotor facing surface of the second brake backing plate and the second friction pad, and iv) securing the second friction pad to the rotor facing surface of the second brake backing plate with the portion of the second leaf positioned between the second friction pad and the rotor facing surface of the second brake backing plate. Steps ii) and iv) can be carried out concurrently, after steps i) and iii).

In some examples, step ii) includes impaling the first friction pad onto barbs of the rotor facing surface of the first brake backing plate. In some examples, step ii) includes adhering the first friction pad to the rotor facing surface of the first brake packing plate.

In some examples, step i) includes positioning the portion of the first leaf in a groove of a plate-facing surface of the first friction pad. In some examples, step i) includes positioning a pair of tines of the first leaf in a pair of grooves of a plate-facing surface of the first friction pad.

According to some aspects, a method of assembling a set of brake pads for a bicycle includes a) fixing at least a portion of a first leaf of a spreader spring to a first brake pad; and b) fixing at least a portion of a second leaf of the spreader spring to a second brake pad.

In some examples, the method further includes, after steps a) and b), inserting the spreader spring, the first brake pad, and the second brake pad into a brake caliper of a bicycle.

In some examples, step a) includes permanently fixing the portion of the first leaf to the first brake pad, and step b) include permanently fixing the portion of the second leaf to the second brake pad.

In some examples, step a) includes i) positioning the portion of the first leaf between a rotor facing surface of a first brake backing plate and a first friction pad, and ii) securing the first friction pad to the rotor facing surface of the first brake backing plate with the portion of the first leaf sandwiched between the first friction pad and the rotor facing surface of the first brake backing plate. In some examples, step b) includes iii) positioning the portion of the second leaf between a rotor facing surface of a second brake backing plate and a second friction pad, and iv) securing the second friction pad to the rotor facing surface of the second brake backing plate with the portion of the second leaf sandwiched between the second friction pad and the rotor facing surface of the second brake backing plate.

In some examples, steps i) and iv) are carried out concurrently.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Various apparatuses or processes will be described below to provide an example of an embodiment of the claimed subject matter. No embodiment described below limits any claim and any claim may cover processes or apparatuses that differ from those described below. The claims are not limited to apparatuses or processes having all of the features of any one apparatus or process described below or to features common to multiple or all of the apparatuses described below. It is possible that an apparatus or process described below is not an embodiment of any exclusive right granted by issuance of this patent application. Any subject matter described below and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

Generally disclosed herein are brake pad assemblies for bicycles, and particularly for use in bicycle disc brakes. The brake pad assemblies can generally include a pair of brake pads and a spreader spring, all three of which are fixed together (e.g. permanently fixed together) and provided as a one-piece unit. Fixing together of the three parts can allow for ease of handling and installation. In some examples, the three parts are fixed together during assembly of the brake pads themselves. That is, in some examples, as opposed to a two-step process of assembling the brake pads and then assembling the spreader spring to the brake pads, there is a single step of assembling the brake pads and concurrently assembling the spreader spring to the brake pads.

As used herein, the term 'fixed to' means that the referenced parts cannot be manually separated without destroying or damaging the referenced parts such that they cannot be put back together (for example, the referenced parts cannot be separated by manual removal of a pin or clip or by sliding the parts apart manually). As used herein, the term 'permanently fixed to' means that the referenced parts cannot be separated, whether manually or otherwise, without damaging or destroying the referenced parts such that they cannot be put back together (for example, the referenced parts cannot be separated with the use of a tool or machine).

Figures 1, 2, 3:
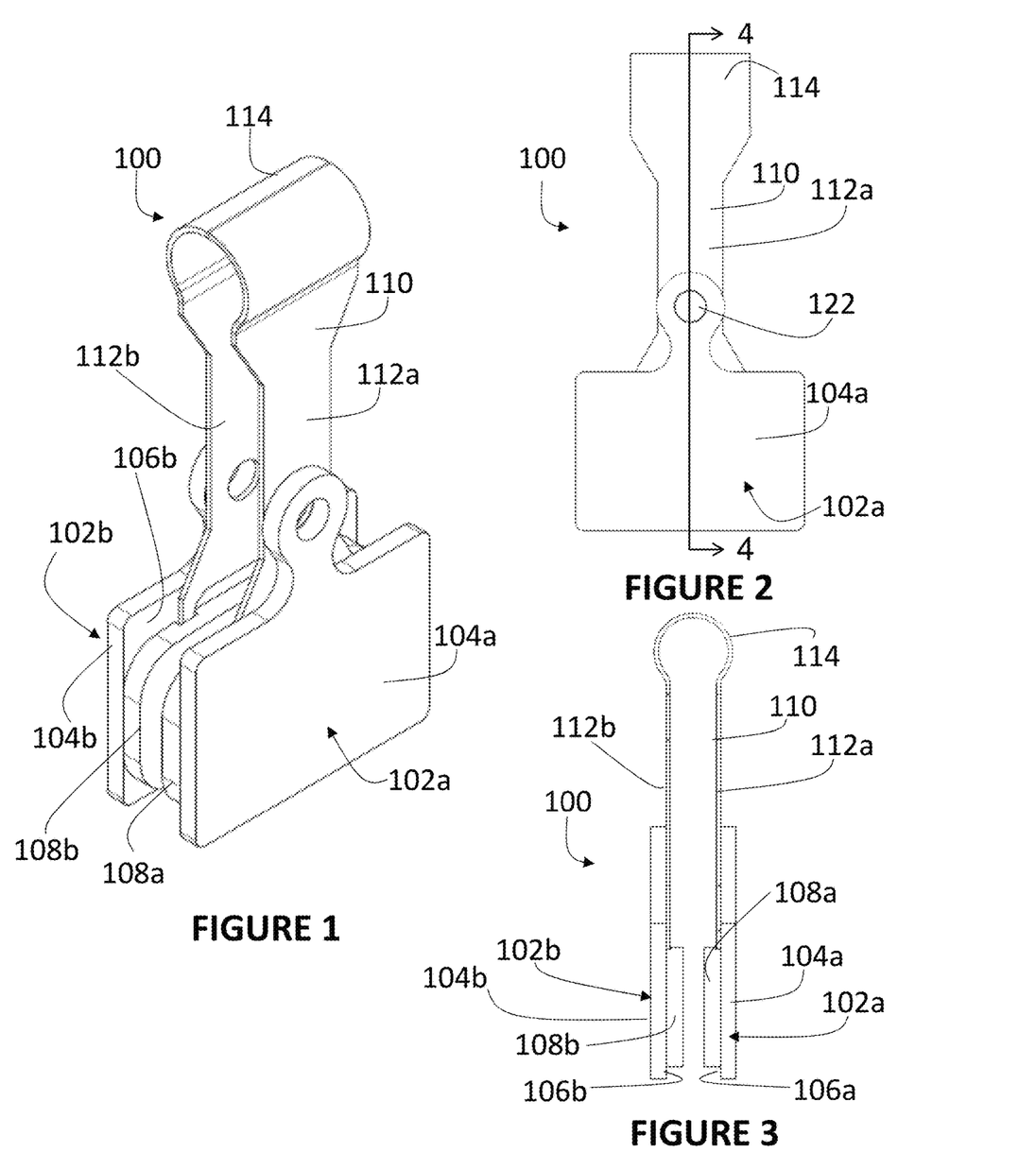
FIG. 1 is a perspective view of an example brake pad assembly.
FIG. 2 is a front view of the assembly of FIG. 1.
FIG. 3 is a side view of the assembly of FIG. 1.
Figures 4, 5:
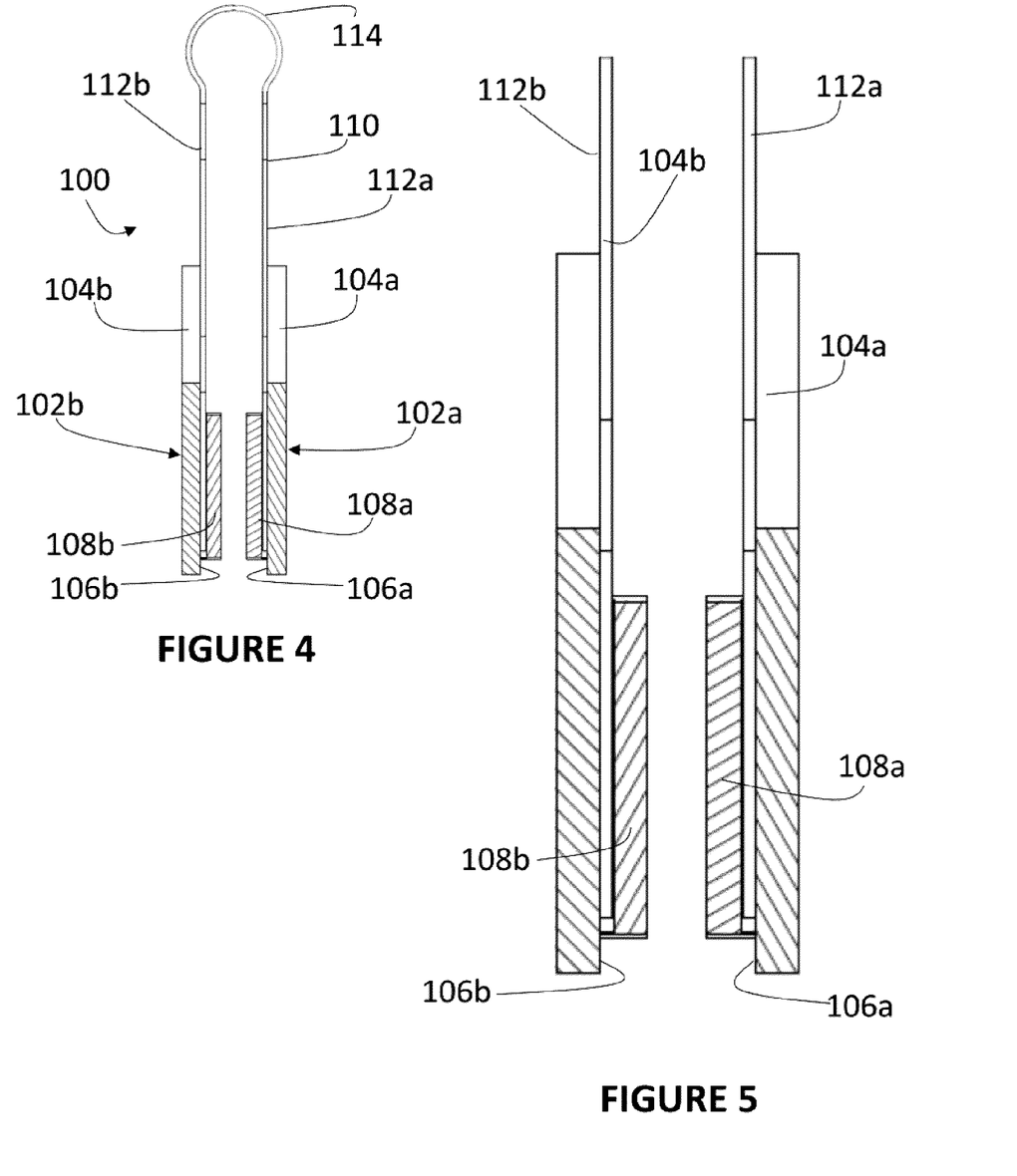
FIG. 4 is a cross-section taken along line 4-4 in FIG. 2.
FIG. 5 is an enlarged view of a portion of FIG. 4.
Figure 6:
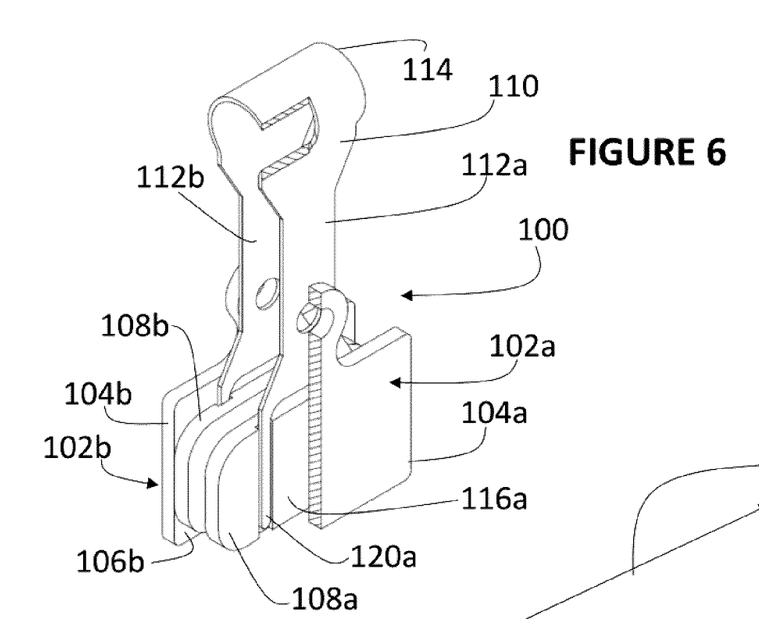
FIG. 6 is a perspective cutaway view of the assembly of FIG. 1.

Referring now to FIGS. 1 to 3, an example brake pad assembly 100 is shown. The assembly 100 includes a pair of brake pads, 102*a*, 102*b*. Each of the brake pads 102*a*, 102*b* has a respective backing plate 104*a*, 104*b* with a respective rotor facing surface 106*a*, 106*b*. A respective friction pad 108*a*, 108*b* is secured to each rotor facing surface 106*a*, 106*b*. In this document, the brake pads 102*a*, 102*b* may in some instances be referred to as a 'first' brake pad 102*a* and a 'second' brake pad 102*b*. Furthermore, the backing plate 104*a*, rotor facing surface 106*a*, and friction pad 108*a* of the first brake pad 102*a* may be referred to as a 'first' backing plate 104*a*, 'first' rotor facing surface 106*a*, and 'first' friction pad 108*a*. Likewise, the backing plate 104*b*, rotor facing surface 106*b*, and friction pad 108*b* of the second brake pad 102*b* may be referred to as a 'second' backing plate 104*b*, 'second' rotor facing surface 106*b*, and 'second' friction pad 108*b*. The first friction pad 108*a* and second friction pad 108*b* face each other, so that in use, upon application of a braking force (e.g. by the squeezing of hand breaks), the friction pads 108*a*, 108*b* are compressed towards each other to squeeze a rotor of the bicycle (not shown).

The backing plates 104*a*, 104*b* may optionally be steel backing plates, and may, for example, be fabricated by stamping.

The friction pads 108*a*, 108*b* may be made from any suitable friction material, such as resin with various additives and fillers. As will be described in further detail below, the friction pads 108*a*, 108*b* may optionally be pre-formed and secured to the respective rotor facing surfaces 106*a*, 106*b*, for example by using a mechanical fastener or an adhesive. Alternatively, the friction pads 108*a*, 108*b* may be molded onto the respective rotor facing surfaces 106*a*, 106. Optionally, the rotor facing surfaces 106*a*, 106*b* may include barbs for retaining the friction pads 108*a*, 108*b*, for example by impaling pre-formed friction pads 108*a*, 108*b* onto the barbs, or by moulding the friction pads 108*a*, 108*b* onto the barbs.

Referring still to FIGS. 1 to 3, the brake pad assembly 100 further includes a spreader spring 110, which functions to spread the friction pads 108*a*, 108*b* apart from the rotor after the braking force is released. Particularly, the spreader spring 110 is biased towards a spread position, shown in FIGS. 1 to 7, in which the first brake pad 108*a* and second brake pad 108*b* are spaced apart from each other. The spreader spring 110 is moveable to a compressed position (not shown) in which the first brake pad 108*a* and the second brake pad 108*b* are moved towards each other relative to the spread position.

Referring still to FIGS. 1 to 3, as mentioned above, the brake pads 102*a*, 102*b* are fixed to the spreader spring 110—i.e. they cannot be manually separated without destruction or damage of the parts, as described above. More specifically, in the example shown, the brake pads 102*a*, 102*b* are permanently fixed to the spreader spring 110—i.e. they cannot be separated at all without destruction or damage of the parts as described above. Namely, in the example shown, the spreader spring 110 has a pair of leaves 112*a*, 112*b*, also referred to herein as a first leaf 112*a* and a second leaf 112*b*. The first leaf 112*a* and the second leaf 112*b* are joined together at a generally U-shaped spring joint 114, which is resiliently flexible. The first leaf 112*a* is permanently fixed to the first brake pad 102*a*, and the second leaf 112*b* is permanently fixed to the second brake pad 102*b*.

The leaves 112*a*, 112*b* of the spreader spring 110 may be fixed to the respective brake pads 102*a*, 102*b* in a variety of ways, for example by the use of adhesives or mechanical fasteners such as rivets. Furthermore, only a portion of each leaf 112*a*, 112*b* may be fixed to the respective brake pads 102*a*, 102*b*, or an entirety of each leaf 112*a*, 112*b* may be fixed to the respective brake pads 102*a*, 102*b*. Referring to FIGS. 4 to 7, in the example shown, a portion of the first leaf 112*a* is positioned and fixed in place between the first rotor facing surface 106*a* and the first friction pad 108*a*, and a portion of the second leaf 112*b* is positioned and fixed in place between the second rotor facing surface 106*b* and the second friction pad 108*b*. More specifically, referring to FIG. 7, the first friction pad 108*a* has a first plate facing surface 116*a*, and the plate facing surface 116*a* has a pair of grooves 118*a*, 118*b* therein (also referred to herein as a first groove 118*a* and a second groove 118*b*). The first leaf 112*a* of the spreader spring 110 is forked, and includes a pair of tines 120*a*, 120*b* (also referred to herein as a first tine 120*a* and a second tine 120*b*). The first tine 120*a* is received and fixed in the first groove 118*a* and the second tine 120*b* is received and fixed in the second groove 118*b*. Likewise (and not shown), the second friction pad 108*b* has a second plate facing surface, and the second plate facing surface has a pair of grooves therein (also referred to herein as a third groove and a fourth groove). The second leaf 112*b* of the spreader spring 110 is forked, and includes a pair of tines (also referred to herein as a third tine and a fourth tine). The third tine is received and fixed in the third groove and the fourth tine is received and fixed in the fourth groove.

Figure 7:
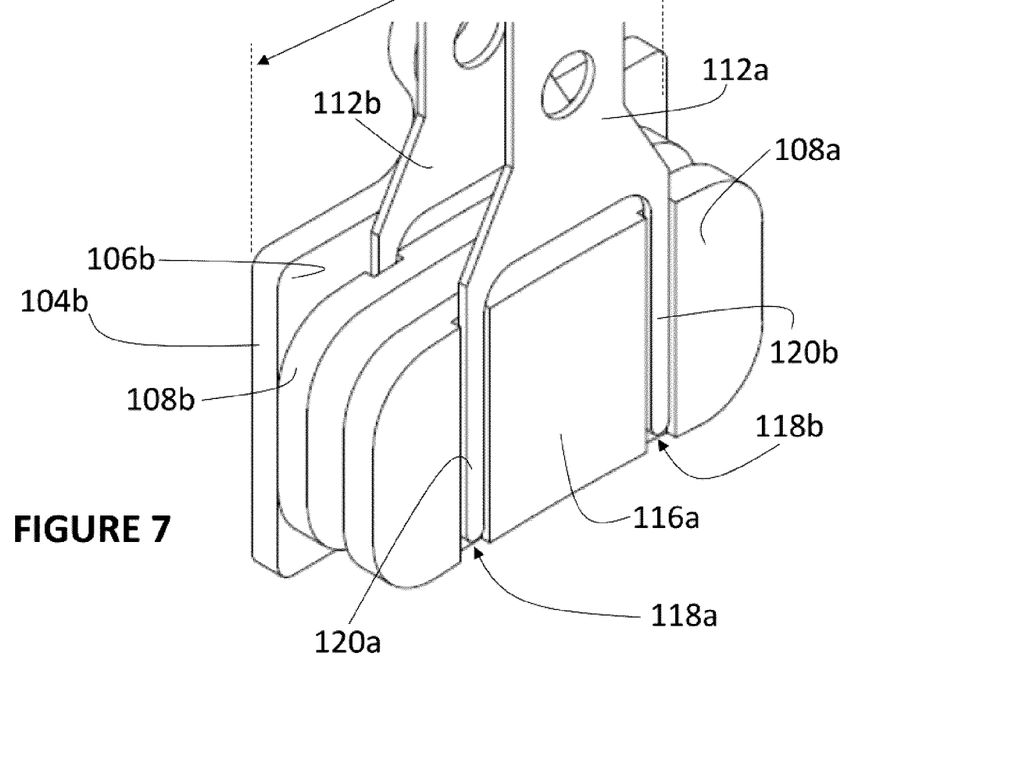
FIG. 7 is an enlarged perspective view of the brake pads of the assembly of FIG. 1, with the second brake pad removed to show the plate facing surface of the friction pad.

In the example shown, the tines 120*a*, 120*b* are fixed in the grooves by friction and by the use of adhesives—i.e. the tines 120*a*, 120*b* are tightly sandwiched between the respective friction pads 108*a*, 108*b* and backing plates 104*a*, 104*b*, and an adhesive is used to further fix the tines 120*a*, 120*b* in place. In alternative examples, adhesives alone can be used to fix the tines in the grooves, or friction alone can be used to fix the tines in the grooves, or another technique can be used to fix the tines in the grooves.

Referring to FIG. 7, the rotor facing surfaces 106*b* has a plate width 107*b*, and the friction pad 108*b* has a pad width 109*b*. In the example shown, the plate width and the pad width are approximately equal. That is, because the third and fourth tines are positioned in the third and fourth grooves, it is not necessary to leave a space on either side of the friction pad 108*b* for the tines to sit, and the friction pad 108*b* can extend the full width of the backing plate 104*b*. This can allow for improved braking efficiency.

Referring back to FIGS. 1 and 2, the first backing plate 104*a*, first leaf 112*a*, second backing plate 104*b*, and second leaf 112*b* each have a respective aperture extending therethrough. For simplicity, only the aperture 122 of the first backing plate 104*a* is labelled in FIGS. 1 and 2. The apertures are aligned along a common axis. Upon installation of the assembly 100 in a brake caliper of a bicycle, a pin or other fastener can be inserted through the apertures, in order to retain the assembly 100 in place in the caliper. Since in the example shown the apertures are aligned along a common axis and fixed in this position, the pin can be inserted with relative ease.

In general, in order to manufacture the assembly, at least a portion of the first leaf 112*a* (e.g. the first tine 120*a* and second tine 120*b*) can be positioned between the first rotor facing surface 106a and the first friction pad 108a, and the first friction pad 108a can then be secured to the first rotor facing surface 106a, with the portion of the first leaf 121a positioned between the first friction pad 108a and the first rotor facing surface 106a, to concurrently fix the first friction pad 108a to the first backing plate 104a and the first leaf 112a to the first brake pad 102a. Likewise, at least a portion of the second leaf 112b (e.g. the third and fourth tines) can be positioned between the second rotor facing surface 106b and the second friction pad 108b, and the second friction pad 108b can then be secured to the second rotor facing surface 106b with the portion of the second leaf 112b positioned between the second friction pad 108b and the second rotor facing surface 106b, to concurrently fix the second friction pad 108b to the second backing plate 104b and the second leaf 112b to the second brake pad 102b. More specifically, with reference to the first brake pad 102a, the first tine 120a and second tine 120b of the first leaf 112a can be nested within the first groove 118a and second groove 118b of the first friction pad. A bead of adhesive can then be applied to the first plate facing surface 116a and/or to the first rotor facing surface 106a. The first backing plate 104a can then be aligned with the first friction pad 108a, with the first 120a and second 120b tines therebetween, and the first backing plate 104a and first friction pad 108a can be pressed together until the adhesive has set and/or cured and/or dried. This can be repeated with the second brake pad 102b, optionally concurrently with the first brake pad 102a.

Figure 8A:
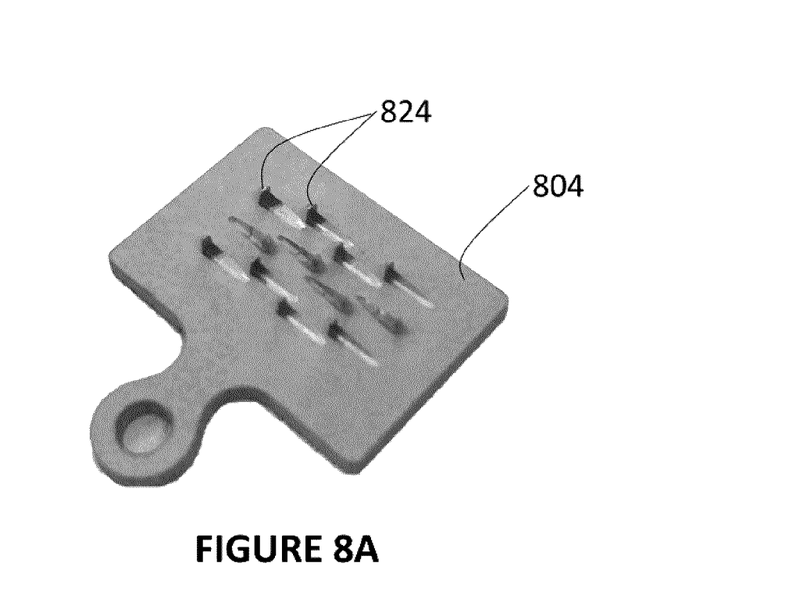
FIG. 8A is a perspective view of a backing plate.
Figure 8B:
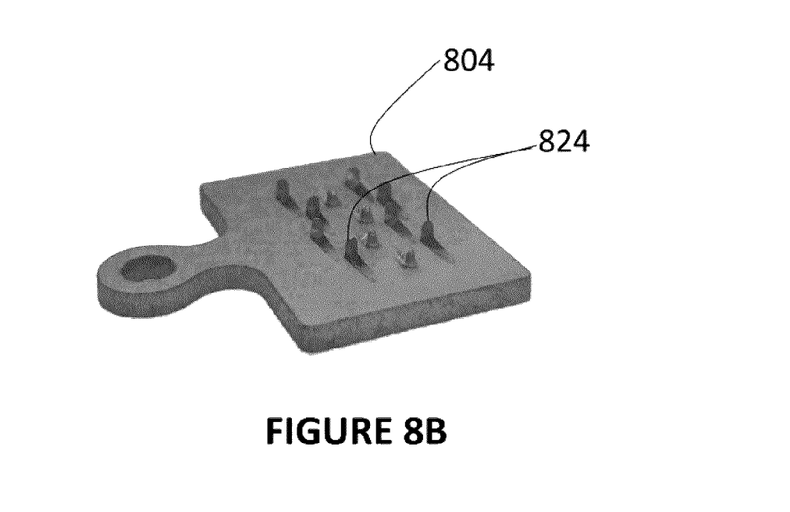
FIG. 8B is another perspective view of the backing plate.

In some examples (not shown), in addition to or as an alternative to the use of adhesives, barbs on the rotor facing surfaces of the backing plates can be used to secure the backing plates to the friction pads, and thereby fix the spreader spring to the brake pads. Such barbs are described for example in U.S. Pat. No. 6,431,331 (Arbesman) and US Patent Application Publication No. 20160363183 (Arbesman et al.), both of which are incorporated herein by reference. In such examples, the friction pads can optionally be molded onto the backing plates, with the tines of the spreader spring between the friction pads and the backing plates. Alternatively, the friction pads can be pre-formed and then pressed on to the backing plates, with the tines of the spreader spring between the friction pads and the backing plates, to impale the friction pads on the barbs. In such cases, the barbs can optionally impale the tines, or can be flattened by the tines. An example of a backing plate 804 including barbs 824 is shown in FIGS. 8A and 8B. The backing plate 804 is shown prior to being secured to a friction pad.

In order to install the assembly, the spreader spring 110, first brake pad 102a, and second brake pad 102b—fixed together as a one-piece unit—can be inserted into a brake caliper. A pin or other fastener can then be inserted through the apertures of the plates and leaves, in order to retain the assembly in position in the brake caliper. Since the parts are fixed together as a one-piece unit, the assembly can be inserted with relative ease, and the pin can be inserted through the assembly with relative ease. Furthermore, in order to remove the assembly (e.g. for replacement), the spreader spring 110, first brake pad 102a, and second brake pad 102b-fixed together as a one-piece unit—can be removed from the brake caliper The brake pads 102a, 102b shown in FIGS. 1 to 7 are sized and shaped to fit a particular model of brake caliper. In alternative examples, brake pad assemblies may include various other sizes and shapes of brake pads.

While the above description provides examples of one or more processes or apparatuses, it will be appreciated that other processes or apparatuses may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, such disclaimer is hereby rescinded and retracted.

I claim:

1. A brake pad assembly for a bicycle, comprising:
   a first brake pad having a first backing plate with a first rotor facing surface, and a first friction pad secured to the rotor facing surface;
   a second brake pad having a second backing plate with a second rotor facing surface, and a second friction pad secured to the second rotor facing surface and facing the first friction pad; and
   a spreader spring having a first leaf and a second leaf, wherein at least a portion of the first leaf is fixed between the first rotor facing surface and the first friction pad, and at least a portion of the second leaf is fixed between the second rotor facing surface and the second friction pad, and wherein the spreader spring is biased towards a spread position in which the first brake pad and second brake pad are spaced apart from each other, and is moveable to a compressed position in which the first brake pad and the second brake pad are moved towards each other relative to the spread position; wherein
   the first leaf is forked and comprises a first tine and a second tine,
   the first friction pad has a first plate-facing surface joined to the first rotor facing surface, and the first plate-facing surface comprises a first groove and a second groove, and
   the first tine is received and fixed in the first groove and the second tine is received and fixed in the second groove.

2. The brake pad assembly of claim 1, wherein the first friction pad has the first plate-facing surface joined to the first rotor facing surface, and the portion of the first leaf is received and fixed in the first groove of the first plate-facing surface.

3. The brake pad assembly of claim 2, wherein the second friction pad has a second plate-facing surface joined to the second rotor facing surface, and the portion of the second leaf is received and fixed in the second groove of the second plate-facing surface.

4. The brake pad assembly of claim 3, wherein the portion of the second leaf is fixed in the second groove of the second plate facing surface by friction.

5. The brake pad assembly of claim 3, wherein the portion of the second leaf is fixed in the second groove of the second plate facing surface by an adhesive.

6. The brake pad assembly of claim 1, wherein the portion of the first leaf is fixed in the first groove by friction.

7. The brake pad assembly of claim 1, wherein the portion of the first leaf is fixed in the first groove by an adhesive.

8. The brake pad assembly of claim 1, wherein
   the second leaf is forked and comprises a third tine and a fourth tine, the second friction pad has a second plate-facing surface joined to the second rotor facing surface, and the second plate-facing surface comprises a third groove and a fourth groove, and the third tine is received and fixed in the third groove and the fourth tine is received and fixed in the fourth groove.

9. The brake pad assembly of claim 1, wherein the first friction pad is adhered to the first rotor facing surface and the second friction pad is adhered to the second rotor facing surface.

10. The brake pad assembly of claim 1, wherein the first friction pad is mechanically secured to the first rotor facing surface and the second friction pad is mechanically secured to the second rotor facing surface.

11. The brake pad assembly of claim 1, wherein the first friction pad is molded onto the first rotor facing surface and the second friction pad is molded onto the second rotor facing surface.

12. A brake pad assembly for a bicycle, comprising:
a first brake pad having a first backing plate with a first rotor facing surface, and a first friction pad secured to the rotor facing surface;
a second brake pad having a second brake backing plate with a second rotor facing surface, and a second friction pad secured to the second rotor facing surface and facing the first friction pad; and
a spreader spring having a first leaf fixed to the first brake pad and a second leaf fixed to the second brake pad, the spreader spring biased towards a spread position in which the first brake pad and second brake pad are spaced apart from each other, and moveable to a compressed position in which the first brake pad and the second brake pad are moved towards each other relative to the spread position; wherein
the first leaf is forked and comprises a first tine and a second tine,
the first friction pad has a first plate-facing surface joined to the first rotor facing surface, and the first plate-facing surface comprises a first groove and a second groove, and
the first tine is received and fixed in the first groove and the second tine is received and fixed in the second groove.

13. The brake pad assembly of claim 12, wherein the first leaf is permanently fixed to the first brake pad and the second leaf is permanently fixed to the second brake pad.

14. The brake pad assembly of claim 12, wherein a portion of the first leaf is positioned between the first rotor facing surface and the first friction pad, and a portion of the second leaf is positioned between the second rotor facing surface and the second friction pad.

15. The brake pad assembly of claim 12, wherein the first friction pad has the first plate-facing surface joined to the first rotor facing surface, and the portion of the first leaf is received and fixed in the first groove of the first plate-facing surface.

16. The brake pad assembly of claim 15, wherein the second friction pad has a second plate-facing surface joined to the second rotor facing surface, and the portion of the second leaf is received and fixed in the second groove of the second plate-facing surface.

17. The brake pad assembly of claim 12, wherein
the second leaf is forked and comprises a third tine and a fourth tine,
the second friction pad has a second plate-facing surface joined to the second rotor facing surface, and the second plate-facing surface comprises a third groove and a fourth groove, and
the third tine is received and fixed in the third groove and the fourth tine is received and fixed in the fourth groove.

18. A method of assembling a brake pad assembly for a bicycle, the method comprising:
a. fixing at least a portion of a first leaf of a spreader spring between a rotor facing surface of a first brake backing plate and a first friction pad; and
b. fixing at least a portion of a second leaf of the spreader spring between a rotor facing surface of a second brake backing plate and a second friction pad; and
wherein step a) comprises i) positioning the portion of the first leaf between the rotor facing surface of the first brake backing plate and the first friction pad, and ii) securing the first friction pad to the rotor facing surface of the first brake backing plate with the portion of the first leaf positioned between the first friction pad and the rotor facing surface of the first brake backing plate; and step b) comprises iii) positioning the portion of the second leaf between the rotor facing surface of the second brake backing plate and the second friction pad, and iv) securing the second friction pad to the rotor facing surface of the second brake backing plate with the portion of the second leaf positioned between the second friction pad and the rotor facing surface of the second brake backing plate; wherein step i) also comprises positioning a pair of tines of the first leaf in a pair of grooves of a plate-facing surface of the first friction pad.

19. The method of claim 18, wherein steps ii) and iv) are carried out concurrently, after steps i) and iii).

20. The method of claim 18, wherein step ii) comprises impaling the first friction pad onto barbs of the rotor facing surface of the first brake backing plate.

21. The method of claim 18, wherein step ii) comprises adhering the first friction pad to the rotor facing surface of the first brake backing plate.

22. The method of claim 18, wherein step i) comprises positioning the portion of the first leaf in a groove of a plate-facing surface of the first friction pad.

* * * * *